United States Patent [19]

Stern

[11] Patent Number: 6,002,224
[45] Date of Patent: *Dec. 14, 1999

[54] ONE TOUCH VEHICLE WINDOW OPERATING CIRCUIT

[75] Inventor: Eric J. Stern, Farmington Hills, Mich.

[73] Assignee: Yazaki Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/654,598

[22] Filed: May 29, 1996

[51] Int. Cl.$^6$ ........................................................ H02P 7/00
[52] U.S. Cl. ............................................. 318/280; 307/10.1
[58] Field of Search ...................................... 318/280–286, 318/466–470, 474, 434; 307/10.1–10.7; 361/23–33; 160/271, 292, 293.1; 47/26–28, 138

[56] References Cited

U.S. PATENT DOCUMENTS

| | | |
|---|---|---|
| 3,089,729 | 5/1963 | Kumai . |
| 3,551,687 | 12/1970 | Frey . |
| 4,001,661 | 1/1977 | Terabayashi et al. ................... 318/474 |
| 4,450,390 | 5/1984 | Andrei-Alexandru et al. . |
| 4,516,034 | 5/1985 | Bier . |
| 4,562,387 | 12/1985 | Lenhoff .................................... 318/285 |
| 4,621,223 | 11/1986 | Murakami et al. ....................... 318/282 |
| 4,628,234 | 12/1986 | Mizuta et al. ........................... 318/469 |
| 4,683,975 | 8/1987 | Booth et al. . |
| 4,857,813 | 8/1989 | Matsumoto et al. ...................... 318/54 |
| 4,962,337 | 10/1990 | Creed ....................................... 318/280 |
| 4,984,123 | 1/1991 | James ........................................ 361/26 |
| 5,187,381 | 2/1993 | Iwasa et al. . |
| 5,229,695 | 7/1993 | Tsuda et al. ............................ 318/434 |
| 5,372,173 | 12/1994 | Horner . |
| 5,381,065 | 1/1995 | Jones . |
| 5,459,380 | 10/1995 | Augustinowicz ....................... 318/483 |
| 5,483,135 | 1/1996 | Parks ....................................... 318/469 |
| 5,559,375 | 9/1996 | Jo et al. .................................. 307/10.1 |
| 5,572,101 | 11/1996 | Rutkowski et al. ....................... 49/349 |

OTHER PUBLICATIONS

SAE Technical Paper–The Use of Polymeric PTC Devices in Automotive Wiring Systems, Mar. 1993 pp. 87–94.

*Primary Examiner*—Jonathan Wysocki
*Attorney, Agent, or Firm*—Young & Basile, P.C.

[57] ABSTRACT

A one touch operating apparatus includes an actuator connected to a relay and causing actuation of the relay to switch a relay contact to a position supplying electric power to a drive motor to move a component in one direction. A latch circuit maintains power on the relay after momentary actuation of the actuator. An overcurrent protection device and a diode are connected in series between the switchable relay contact and the relay to form the latch circuit. The overcurrent protection device is a positive temperature coefficient resistor which detects a temperature increase resulting from an overcurrent through the motor to open the latch circuit and deenergize the relay terminating electric power to the motor. The overcurrent protective device is automatically resettable.

11 Claims, 2 Drawing Sheets

ONE TOUCH VEHICLE WINDOW OPERATING CIRCUIT

BACKGROUND OF THE INVENTION

1. Field of the Invention

The present invention relates, in general, to vehicle moveable component controls and, specifically, to vehicle power window controls.

2. Description of the Art

Power windows are a common feature in motor vehicles. An actuator, typically a bi-positionable switch, operates an electric circuit to supply electrical power to an electric motor connected to a window movement mechanism to move the window up or down depending upon the activated state of the actuator.

Express or one touch power window controls, sometimes referred to as a "toll-booth windows", are also known. In an express or one touch window operating circuit, the window lowering or opening movement can be initiated by a single actuation of a pushbutton or actuator. In a typical express window control, a specially designed solid state control circuit, shown in FIG. 1, is used to control the express or rapid lowering of the window. The conventional up and down window control switch is connected to the control module and initiates the window lowering operation to completely lower the window upon a momentary pressing of the driver's window control switch to the "down" position. The control module contains current sensing or timer circuitry to detect either a stall condition of the window drive motor or the expiration of a set time period in order to turn off power to the motor. The control module also contains a latch circuit to maintain power to the motor to continue the lowering movement even after the momentary actuation of the actuator has been discontinued by the user.

While the above-described express or one touch window opening circuit is effective in providing express or one touch opening of a vehicle window, the solid state control module typically used in such a one touch circuit is an expensive component and is designed specifically for the one touch function.

Thus, it would be desirable to provide a one touch circuit for a vehicle window or other moveable vehicle closure which is simple in construction, has a low manufacturing cost, and can be used without extensive modification to existing vehicle component controls.

SUMMARY OF THE INVENTION

The present invention is a one touch operating apparatus or circuit which provides express or one touch opening of a moveable component of a motor vehicle.

The one-touch operating circuit is adapted for use with a motor-controlled vehicle closure member or component, such as a vehicle window, which is normally opened and closed by a main up/down actuator. The one-touch operating circuit includes an independently operable one-touch actuator. A first switch in the circuit is operated by the main up/down actuator, and is connected between an electrical source and the window motor to be switchable from an inactive position between up and down actuating positions to supply electric current to the motor to open or close the window. The circuit of the present invention also includes a second switch which is responsive to the one-touch actuator and which is switchable between two positions for connecting and disconnecting electric current to the motor. The second switch is connected to the first switch to supply electric current to the motor through the first switch when the first switch is in the inactive position. This allows rotation of the motor output in one direction to open the window. A latching portion connected to the second switch retains electric power on the second switch after deactuation of the one-touch actuator. A disconnecting structure is connected to the second switch for disconnecting electric power to the second switch in response to an overcurrent to the motor. The disconnecting structure is automatically resettable when the overcurrent has ceased. The main up/down actuator switch can be used to deactivate the one-touch operation.

The one touch window operating apparatus of the present invention provides a simple and inexpensive one touch circuit for operating a vehicle window or other moveable component in a vehicle. The latch circuit employed in the present apparatus allows momentary operation of the actuator. The one touch window operating apparatus may be easily connected to a conventional vehicle window or other component operating circuit without extensive modifications to such circuit or changes in normal circuit functioning.

The use of a positive temperature coefficient resistor as the overcurrent protective means opens the latch circuit upon detecting an overcurrent through the motor as will occur when the motor stalls at the end of movement of the vehicle component to the full open position. Such a device is also automatically resettable thereby quickly resetting the one touch operating apparatus for the next use.

BRIEF DESCRIPTION OF THE DRAWINGS

The various features, advantages, and other uses of the present invention will become more apparent by referring to the following detailed description and drawings in which.

DESCRIPTION OF THE PREFERRED EMBODIMENT

Figure 1:
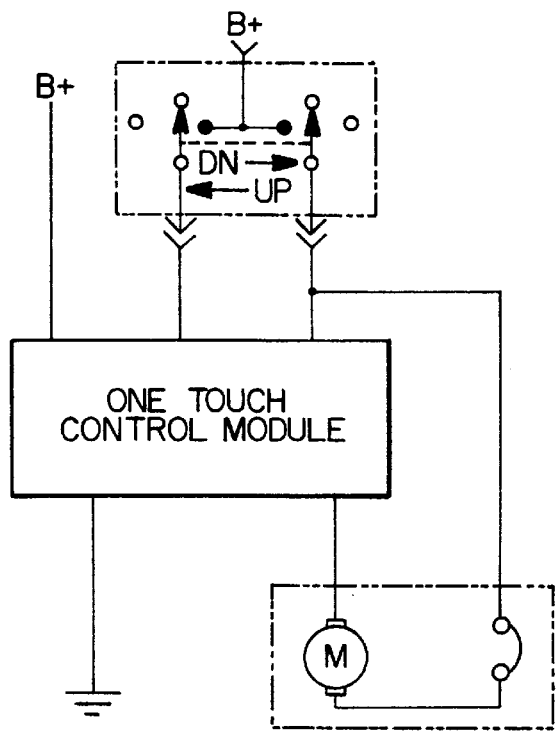
FIG. 1 is a schematic diagram of a conventional prior art one touch window operating circuit.
Figure 3:
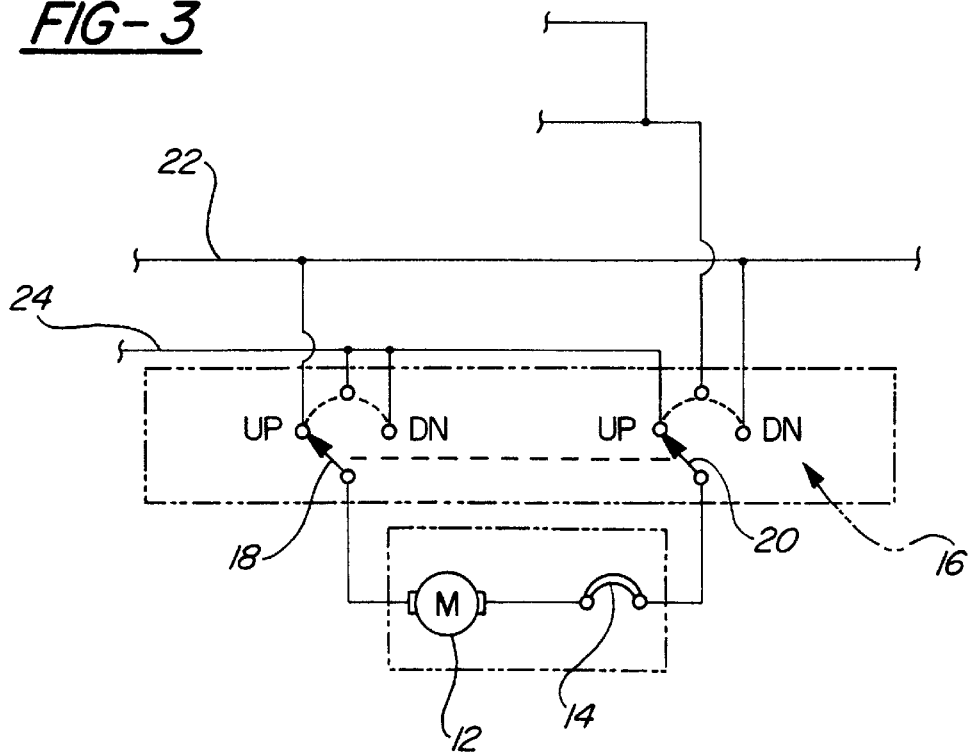
FIG. 3 is a partial schematic diagram depicting the primary window operating switch, shown in FIG. 2, in its "up" position.
Figure 2:
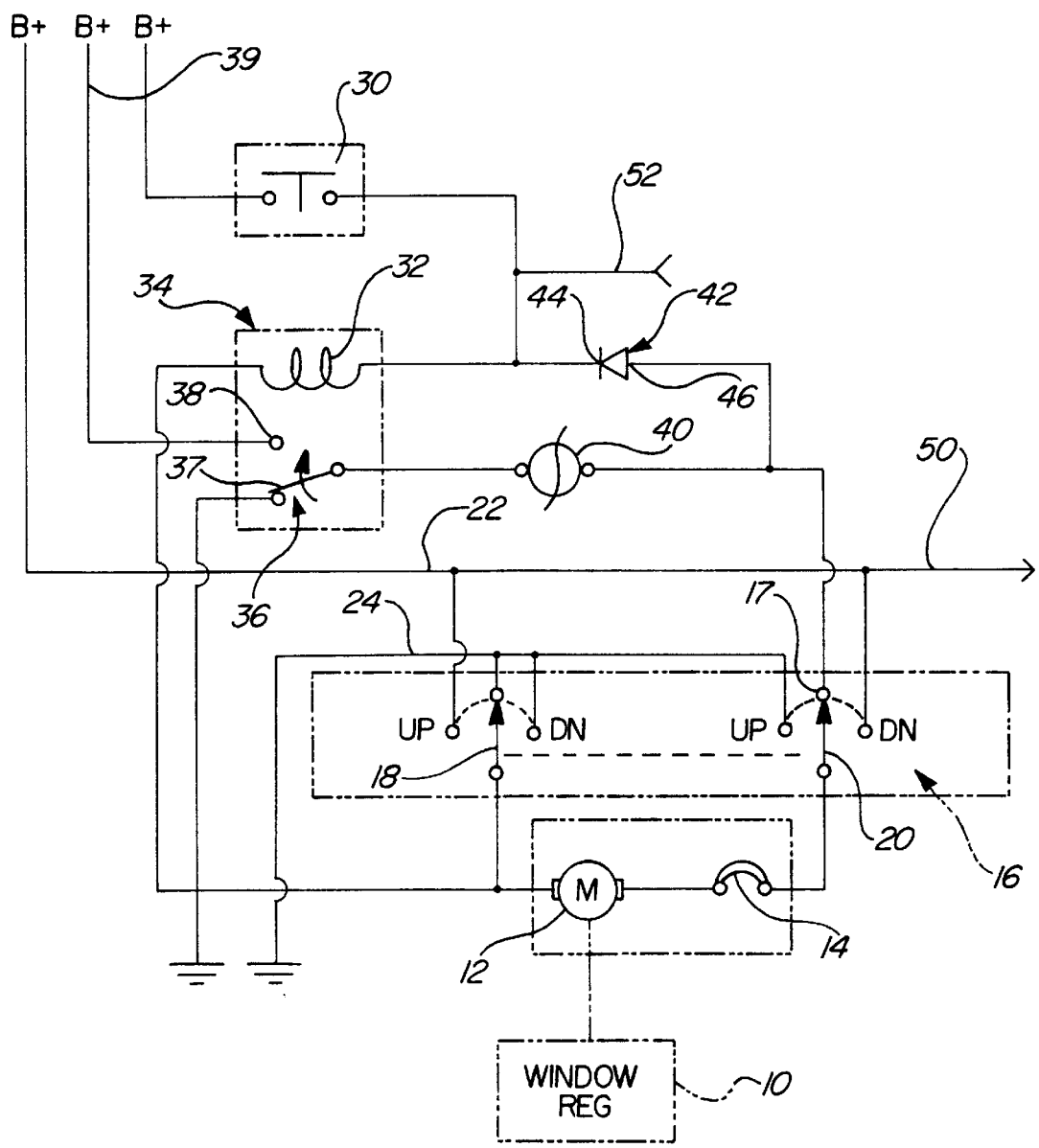
FIG. 2 is a schematic diagram of the one touch operating apparatus circuit of the present invention.

Referring now to the drawing, and to FIGS. 2 and 3 in particular, there is depicted a one touch circuit for moving a vehicle component in one direction to open an aperture in the vehicle. Although the following description of the one touch operating apparatus of the present invention will be discussed in conjunction with a vehicle window, such as the driver's window of a motor vehicle, it will be understood that the present invention may also be advantageously employed in other applications, such as express, one touch opening of a vehicle sunroof, sliding door, etc.

As shown in FIG. 2, a window regulator 10 which controls the sliding movement of a vehicle window between open and closed positions in a vehicle door is controlled by a reversible DC motor 12. A fuse 14 or overcurrent protection device is connected in series with the motor to provide overcurrent protection.

The output shaft of the motor 12, which is connected to the window regulator 10, is rotated in one of two opposite directions depending upon the polarity of electrical current applied to the motor 12.

The polarity of current flow is controlled by a modified bi-positionable switch 16 mounted in an accessible position in the vehicle. The modified switch 16 is characterized by an isolated contact 17 which is not bussed to ground as is common practice. The switch 16, by example, is a two pole switch including a first contact 18 and a second contact 20 which move in unison between a normal, center position shown in FIG. 2 and either one of two operative positions, denoted as "UP" and "DN."

The "UP" terminal of the first contact 18 and the "DN" terminal of the second contact 20 are connected to a positive voltage lead 22 from the vehicle battery. The "DN" terminal of the first contact 18 and the "UP" terminal of the second contact 20 are connected to ground via lead 24.

When the user desires to raise the window in a conventional, non-express manner, as shown in FIG. 3, the user moves the primary switch 16 to the "UP" position which switches both contacts 18 and 20 to the "UP" terminals. In this position, electric current on lead 22 flows through the first contact 18 to the motor 12 and fuse 14 and then through the second contact 20 to ground via lead 24. Power is supplied to the motor 12 and the output shaft of the motor 12 rotates to raise the window as long as the switch 16 is held in the "UP" position by the user. It is clear from FIG. 3 that movement of the switch 16 in the opposite direction to connect the contacts 18 and 20 to the "DN" terminals, connects power from lead 22 to the second contact 20. The opposite terminal of the motor 12 is then connected by the first contact 18 to ground via lead 24. This reverses the direction of current flow to the motor 12 thereby rotating the output shaft of the motor 12 in an opposite direction which has the effect of operating the window regulator 10 to lower the window.

The one touch operating apparatus of the present invention is shown in detail in FIG. 2. The apparatus includes an actuator 30, such as a pushbutton or other switch, which is selectively moveable by a user from a normal, open position shown in FIG. 2 to a closed position in which the switchable contact of the actuator 30 connects power from a power source, such as the vehicle battery, to the one touch circuit.

The actuator 30 is connected to a coil 32 of a conventional relay 34. When the primary switch 16 is in the normal, inactive position as shown in FIG. 2 in which each contact 18 and 20 is connected between common and a center terminal, the output side of the relay coil 32 is connected through the first contact 18 to ground via the lead 24. In this manner, whenever the actuator 30 is actuated by the user, current is supplied to the relay coil 32 thereby activating the relay coil 32 and causing a switchable contact 36 of the relay 34 to switch from a first normal position shown in FIG. 2 to a second position connecting terminal 38 to the common contact terminal. The common contact terminal 38 is connected to a separate, independent power source from the vehicle battery to supply current through the contact 38 and a series connected overcurrent protection means 40 to the center terminal of the second contact 20 of the primary window operating switch 16.

A blocking diode 42 has a cathode 44 connected to the relay coil 32 as shown in FIG. 2. The anode 46 of the diode 42 is connected to the connection between the overcurrent protection means 40 and the center terminal of the second contact 20. The diode 42 blocks current flow from the actuator 30 to the primary switch 16 and, also, blocks current flow from the actuator 30 through the first terminal 37 of the relay to ground via switchable contact 36. However, the diode 42, the relay contact 38, and the overcurrent protection means 40 form a latch means or circuit which connects power from an independent supply lead 39 to the relay coil 32 thereby maintaining the relay coil 32 in an energized state despite the fact that the user may have released the actuator 30 after a momentary actuation.

As shown in FIG. 2, after the user actuates the actuator 30, thereby energizing the relay coil 32, switchable contact 36 moves from the first terminal 37 to the second terminal 38 thereby connecting lead 39 from the vehicle battery to the contact 36, the overcurrent protection means 40, the center terminal of the second switch contact 20 and the motor 12. Current flows in a direction or polarity to cause the output shaft of the motor 12 to rotate in a direction to operate the window regulator 10 to lower the vehicle window.

The motor 12 remains energized with its output shaft rotating in a direction to lower the window until the window reaches a fully lowered position. At this position, the motor 12 stalls thereby generating an overcurrent which is detected by the overcurrent protection means 40. In a preferred embodiment, the overcurrent protection means 40 is a polymeric positive temperature coefficient resistor. In such a resistor, if current rises above a current trip threshold, the heat generated within the resistor raises the internal temperature to a level at which the crystalline structure of the resistor switches to an amorphous state thereby causing a rapid increase in the resistance of the overcurrent protection device. This increased resistance reduces the current that can flow under the fault condition and has the effect of opening the latch circuit from the power source through the contact 38 to the diode 42 and relay coil 32 causing deenergization of the relay coil 32. A unique feature of a positive temperature coefficient resistor (PTC) is that it automatically resets to a crystalline state when the internal temperature has lowered to a predetermined level. This resets the circuit for another operation.

At any time during one touch movement of the window, a user initiated switching of the primary switch 16 to either the "UP" or "DN" position will open the latch circuit from the relay coil 32 to ground. This will open the latch circuit and immediately stop further movement of the window.

As shown in FIG. 2, the one touch window operating apparatus of the present invention is easily connected to a primary window operating switch 16 without modification to the electrical connections or normal functioning of the switch 16. As is conventional, a lead 50 extending from the positive voltage power supply may extend from the switch 16 to a main window lock out switch as well as other vehicle window switches, not shown. Similarly, a lead 52 from an optional remote input may be connected in parallel with the actuator 30 to initiate the one touch window opening from a location other than by the actuator 30.

In summary, there has been disclosed a unique one touch vehicle component operating apparatus which is simple in construction for a low manufacturing cost and ease of connection to existing vehicle component operating circuits. The one touch apparatus of the present invention also maintains power to the component operating circuit despite momentary actuation of a one touch actuator. Finally, the one touch apparatus includes an overcurrent protection means which automatically resets to provide quick repetitive operation of the one touch circuit.

What is claimed is:

1. A one touch operating circuit adapted for use with a motor-controlled vehicle window opened and closed by a main up/down actuator, comprising:

an independently operable one-touch actuator movable to an actuating position to supply electric current from an electrical power source;

first switch means adapted to be operated by the main up/down actuator, connected between an electrical power source and the motor and switchable from an inactive position between two actuating positions, for supplying electric current to the motor in opposing polarities for bi-directional rotation of a motor output to open and close a window;

second switch means, responsive to the one-touch actuator and switchable between two positions, for connecting and disconnecting electric current to the motor, the second switch means connected to the first switch means for supplying electric current to the motor through the first switch means when the first switch means is in the inactive position for rotation of the motor output in one direction to open the window;

latch means, connected to the second switch means, for retaining electric power on the second switch means after de-actuation of the one-touch actuator; and disconnecting means, connected to the second switch means, for disconnecting electric power to the second switch means in response to an overcurrent through the motor, the disconnecting means being automatically resettable when the overcurrent has ceased.

2. The apparatus of claim 1 wherein the second switch means comprises:

a relay having a coil electrically connected to the one-touch actuator and to ground and having a switchable contact, the switchable contact switching from the first position to the second position upon energization of the relay coil, the switchable contact, when in the second position, completing a circuit from the power source to the electric motor through the first switch means to supply electric current to the electric motor in one polarity to rotate the motor output in one direction.

3. The apparatus of claim 1 wherein the first switch means comprises:

a two pole switch having a pair of switchable contacts switchable between the power source and ground to respectively supply electric current from the power source to the motor in opposing directions depending upon an actuated position of the first switch means.

4. The apparatus of claim 3 wherein the first switch means further comprises:

the second pole of the switch having a non-grounded terminal connected to the actuator.

5. The apparatus of claim 3 wherein:

an independent lead connects the power source to the first switch means separate from another independent lead connecting the power source to the actuator.

6. The apparatus of claim 1 further comprising:

a diode connected between the relay and the resettably disconnecting means for allowing current flow through the one-touch actuator only through the relay coil.

7. The apparatus of claim 1 wherein the resettably disconnecting means comprises an automatically resettable positive temperature coefficient resistor.

8. The apparatus of claim 1 wherein the latching means comprises:

a diode having a cathode connected to the relay and an anode connected to the resettably disconnecting means; and the second position of the switchable contact of the relay connected to the power source independent from the connection of the actuator to the power source.

9. The apparatus of claim 8 wherein the first switch means comprises:

first and second switch contacts, each connected to a separate common terminal and switchable in unison between a first terminal, a normal center terminal and a second terminal;

the common terminal of the first switch contact connected to one terminal of the electric motor, the common terminal of the second switch contact connected to an opposite terminal of the electric motor;

the first terminal of the first switch contact and the second terminal of the second switch contact connected to the power source;

the second terminal of the first switch contact, the center terminal of first switch contact, and the first terminal of the second switch contact connected to ground; and the center terminal of the second switch contact connected to the cathode of the diode.

10. A one touch operating circuit as defined in claim 1, further including means associated with the first switch means and the latch means for disconnecting electric power to the second switch means in response to operation of the main up/down actuator.

11. A one touch operating circuit adapted for use with a motor-controlled vehicle window opened and closed by a main up/down actuator using current from an electrical power source, comprising:

an independently operable one-touch actuator movable to an actuating position to supply electric current from the electrical power source;

first switch means adapted to be operated by the main up/down actuator, connected between the electrical power source and the motor and switchable from an inactive position between two actuating positions, for supplying electric current to the motor in opposing polarities for bi-directional rotation of a motor output to open and close a window;

second switch means, responsive to the one-touch actuator and switchable between two positions, for connecting and disconnecting electric current to the motor, the second switch means connected to the first switch means for supplying electric current to the motor through the first switch means when the first switch means is in the inactive position for rotation of the motor output in one direction to open the window;

latch means, connected to the second switch means, for retaining electric power on the second switch means from an independent supply lead from the electrical power source after de-actuation of the one-touch actuator; and means, connected to the second switch means, for disconnecting electric power to the second switch means in response to an overcurrent through the motor and for resetting automatically when the overcurrent has ceased.

* * * * *